United States Patent [19]

Hilderbrandt

[11] Patent Number: 5,634,679
[45] Date of Patent: Jun. 3, 1997

[54] ROTATABLE SPATULA

[76] Inventor: Kenneth D. Hilderbrandt, 35 Spinnaker La., E. Patchogue, N.Y. 11772

[21] Appl. No.: 570,588

[22] Filed: Dec. 11, 1995

[51] Int. Cl.[6] ................................. A47J 43/28
[52] U.S. Cl. ................................... 294/8
[58] Field of Search .................... 294/7, 8, 28, 29, 294/32, 53.5; 30/123, 124, 324

[56] References Cited

U.S. PATENT DOCUMENTS

| D. 272,119 | 1/1984 | Steiner | D7/102 |
|---|---|---|---|
| 557,092 | 3/1896 | Cobb | 294/8 |
| 815,781 | 3/1906 | Banks | 294/8 |
| 984,388 | 2/1911 | Osner | 294/8 |
| 1,214,522 | 2/1917 | Eckert | 294/8 |
| 1,224,351 | 5/1917 | Addison | 294/8 |
| 1,521,525 | 12/1924 | Fults et al. | 294/8 |
| 1,575,275 | 3/1926 | Pearson | 294/8 |
| 2,033,635 | 3/1936 | Imschweiler | 294/8 |
| 4,095,832 | 6/1978 | Slinker | 294/8 |
| 5,355,778 | 10/1994 | Mayfield et al. | 99/441 |
| 5,403,052 | 4/1995 | Lampron | 294/7 |

*Primary Examiner*—Dean Kramer
*Attorney, Agent, or Firm*—Richard L. Miller, P.E.

[57] ABSTRACT

A rotatable spatula that includes a squeezable handle portion and a spatula portion. The spatula portion is rotatively mounted to the squeezable handle portion. When the squeezable handle portion is squeezed the spatula portion rotates and turns over food disposed thereon. The spatula portion has a thin flat substantially rectangular-shaped body with a tapered leading edge and a rounded corner trailing edge.

12 Claims, 1 Drawing Sheet

ROTATABLE SPATULA

BACKGROUND OF THE INVENTION

The present invention relates to a rotatable spatula. More particularly, the present invention relates to a rotatable spatula that includes a squeezable handle portion and a spatula portion that is rotatively mounted to the squeezable handle portion and rotates when the squeezable handle portion is squeezed.

When cooking food it is often necessary to flip the food during its course of cooking. For example, pancakes, hamburgers and the like.

In an attempt to flip the food, a user must first insert a spatula type device under the item to be flipped and then rotate the wrist.

In such an operation, the wrist rotation can cause the hand to move at an angle to the wrist and therefore impart an unwanted movement on the spatula. If the spatula were to experience this type of movement, it is quite possible that the item attempting to be flipped will slide off the spatula in an undesirable direction.

Numerous innovations for rotatable food turners have been provided in the prior art that will be described. However, even though these innovations may be suitable for the specific individual purposes to which they address, they differ from the present invention in that they do not teach a rotatable spatula that includes a squeezable handle portion and a spatula portion that is rotatively mounted to the squeezable handle portion and rotates when said squeezable handle portion is squeezed.

For example, U.S. Pat. No. Des. 272,119 to Steiner teaches a food turner in which the spatula portion is fixedly attached to the handle.

Another example, U.S. Pat. No. 4,095,832 to Slinker teaches a rotating cooking spatula that includes a handle and a two-part spatula tray that has a top portion and a lower portion slightly larger than the top portion. The far end of both the top and lower portions is open. The two-part spatula tray is rotatively movable to the handle by either a rotatable knob together with a 180 degree stop structure, a slide and helical thread structure to effect the 180 degree turning, or a slide knob together with rack and pinion structure connected to a slide knob by a flexible cable.

Finally, still another example, U.S. Pat. No. 5,355,778 to Mayfield et al. teaches a hand held rotatable food roasting apparatus that includes a hollow substantially cylindrical shaped body with an open end and heat permeable openings extending from a handle.

It is apparent that numerous innovations for rotatable food turners have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

Accordingly, an object of the present invention is to provide a rotatable spatula avoids the disadvantages of the prior art.

Another object of the present invention is to provide a rotatable spatula that is simple and inexpensive to manufacture.

Still another object of the present invention is to provide a rotatable spatula that is simple to use.

Yet another object of the present invention is to provide a rotatable spatula that can be used in cooking foods.

Still yet another object of the present invention is to provide a rotatable spatula that can pick up food, such as pancakes, hamburgers, eggs and the like, and turn the food completely over for redepositing upon the original cooking surface without having to rotate the arm of the user.

Briefly stated, yet still another object of the present invention is to provide a rotatable spatula that includes a squeezable handle portion and a spatula portion.

Still yet another object of the present invention is to provide a rotatable spatula wherein the spatula portion is rotatively mounted to the squeezable handle portion.

Yet still another object of the present invention is to provide a rotatable spatula wherein when the squeezable handle portion is squeezed the spatula portion rotates and turns over food disposed thereon.

Still yet another object of the present invention is to provide a rotatable spatula wherein the spatula portion has a thin flat substantially rectangular-shaped body with a tapered leading edge and a rounded corner trailing edge.

Yet still another object of the present invention is to provide a rotatable spatula wherein the thin flat substantially rectangular-shaped body of the spatula portion has a plurality of longitudinally disposed throughslots, so that heat can be dissipated.

Still yet another object of the present invention is to provide a rotatable spatula that further includes a short slender rod that extends outwardly from the center of the rounded corner trailing edge of the thin flat substantially rectangular-shaped body of the spatula portion.

Yet still another object of the present invention is to provide a rotatable spatula wherein the squeezable handle portion includes an elongated slender rod that has a distal end and a proximal end that is fixedly attached to, and extends outwardly from, the short slender rod of the rounded corner trailing edge of the thin flat substantially rectangular-shaped body of the spatula portion.

Still yet another object of the present invention is to provide a rotatable spatula wherein the squeezable handle portion further includes a pinion gear that is fixedly attached to the distal end of the elongated slender rod of the squeezable handle portion.

Yet still another object of the present invention is to provide a rotatable spatula wherein the squeezable handle portion further includes a first member that has a substantially straight flat portion with a proximal end and a rounded distal end.

Still yet another object of the present invention is to provide a rotatable spatula wherein the rounded distal end of the substantially straight flat portion of the first member of the squeezable handle portion has a throughbore.

Yet still another object of the present invention is to provide a rotatable spatula wherein the first member of the squeezable handle portion further has a vertically disposed guide plate that extends upwardly from the proximal end of the substantially straight flat portion of the first member of the squeezable handle portion.

Still yet another object of the present invention is to provide a rotatable spatula wherein the vertically disposed guide plate of the proximal end of the substantially straight flat portion of the first member of the squeezable handle portion has a throughbore.

Yet still another object of the present invention is to provide a rotatable spatula wherein the short slender rod of the rounded corner trailing edge of the thin flat substantially rectangular-shaped body of the spatula portion passes rotatively through the throughbore of the vertically disposed guide plate of the proximal end of the substantially straight flat portion of the first member of the squeezable handle portion.

Still yet another object of the present invention is to provide a rotatable spatula wherein the first member of the squeezable handle portion further has an outwardly extending arcuate shaped portion that extends rearwardly from the rounded distal end of the substantially straight flat portion of the first member of the squeezable handle portion.

Yet still another object of the present invention is to provide a rotatable spatula wherein the outwardly extending arcuate shaped portion of the first member of the squeezable handle portion has a distal end.

Still yet another object of the present invention is to provide a rotatable spatula wherein the squeezable handle portion further includes an inwardly extending flat guide plate that extends inwardly from the distal end of the outwardly extending arcuate shaped portion of the first member of the squeezable handle portion.

Yet still another object of the present invention is to provide a rotatable spatula wherein the inwardly extending flat guide plate of the squeezable handle portion has a throughbore.

Still yet another object of the present invention is to provide a rotatable spatula wherein the distal end of the elongated slender rod of the squeezable handle portion passes rotatively through the throughbore of the inwardly extending flat guide plate of the squeezable handle portion.

Yet still another object of the present invention is to provide a rotatable spatula wherein the squeezable handle portion further includes an arcuate-shaped second member that has a rounded proximal end with a throughbore that enters into, and is pivotally mounted to, the rounded distal end of the substantially straight flat portion of the first member of the handle portion.

Still yet another object of the present invention is to provide a rotatable spatula wherein the arcuate-shaped second member has a distal end.

Yet still another object of the present invention is to provide a rotatable spatula wherein the squeezable handle portion further includes a pivot pin that passes through the throughbore of the rounded distal end of the substantially straight flat portion of the first member of the squeezable handle portion and passes through the throughbore of the rounded proximal end of the arcuate-shaped second member of the squeezable handle portion, so that the arcuate-shaped second member of the squeezable handle portion is pivotally mounted to the first member of the squeezable handle portion.

Still yet another object of the present invention is to provide a rotatable spatula wherein the squeezable handle portion further includes a rack gear that extends inwardly from the distal end of the arcuate-shaped second member of the squeezable handle portion and mechanically engages with the pinion gear of the squeezable handle portion.

Yet still another object of the present invention is to provide a rotatable spatula wherein the squeezable handle portion further includes a spring that extends from the outwardly extending arcuate shaped portion of the first member of the squeezable handle portion to the arcuate-shaped second member of the squeezable handle portion.

Finally, still yet another object of the present invention is to provide a method using a rotatable spatula that includes the steps of slipping a spatula portion of the rotatable spatula under an item of food that is to be flipped, squeezing a squeezable handle portion of the rotatable spatula causing an arcuate-shaped second member of the squeezable handle portion to pivot towards a first member of the squeezable handle portion, causing an inwardly extending rack gear of a distal end of the arcuate-shaped second member to rotate a pinion gear disposed on an elongated slender rod of the squeezable handle portion, causing the elongated slender rod to rotate and flip the spatula portion, so that the item of food is slipped over, unsqueezing the squeezable handle portion, causing, by a spring, the arcuate-shaped second member to pivot away from the first member, causing the inwardly extending rack gear to rotate the pinion gear in the opposite direction, and causing the elongated slender rod to rotate in the opposite direction and flip the spatula portion back to the original position.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows.

LIST OF REFERENCE NUMERALS UTILIZED IN THE DRAWING

Figure 1:
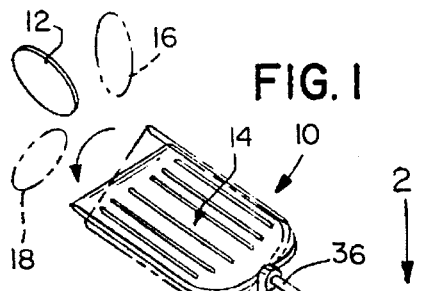
FIG. 1 is a diagrammatic perspective view of the present invention.
Figure 4:
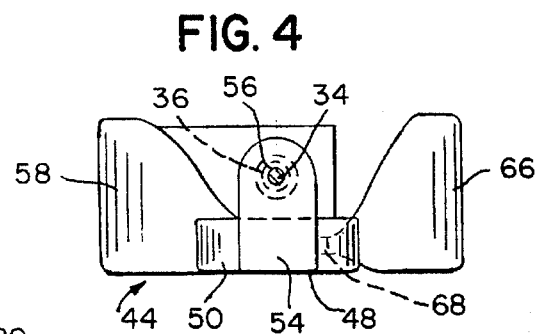
FIG. 4 is an enlarged cross sectional view taken on line 4—4 in FIG. 3.
Figure 2:
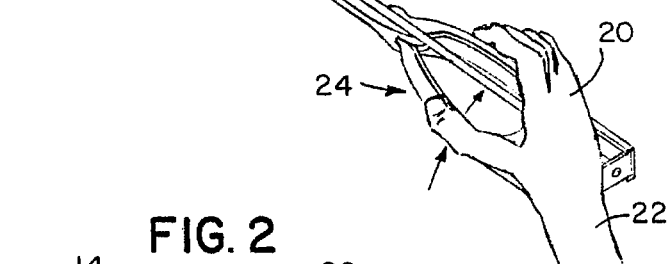
FIG. 2 is an enlarged top plan view taken in the direction of arrow 2 in FIG. 1.
Figure 2:
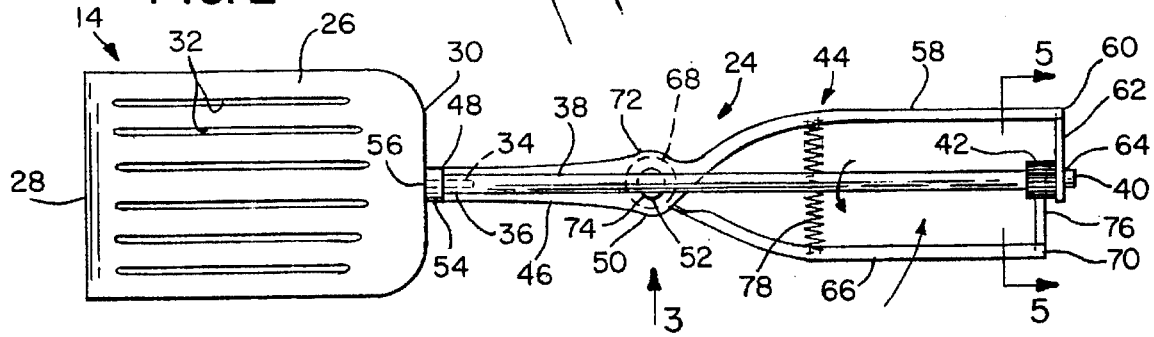
Figure 3:
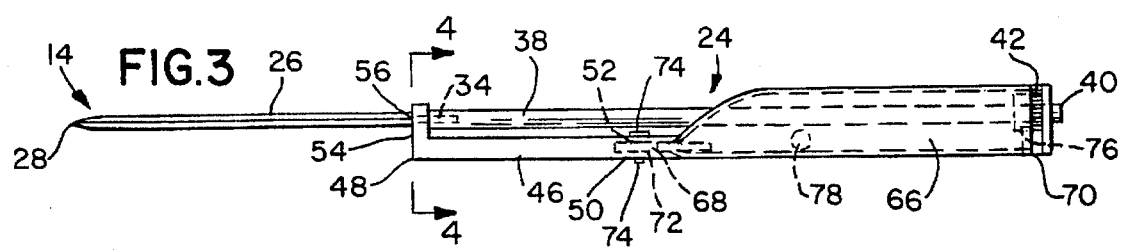
FIG. 3 is a side elevational view taken in the direction of arrow 3 in FIG. 2.
Figure 5:
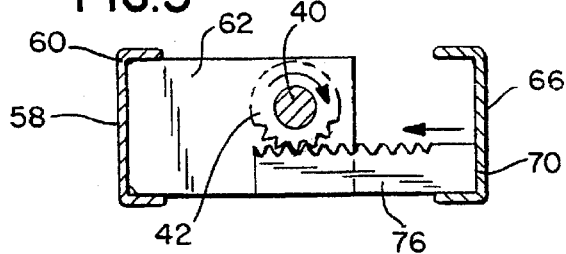
FIG. 5 is an enlarged cross sectional view taken on line 5—5 in FIG. 3.

10: rotatable spatula of the present invention
12: item of food
14: spatula portion
16: item of food initial position
18: item of food flipped position
20: user hand
22: user
24: handle portion
26: spatula portion thin flat substantially rectangular-shaped body
28: spatula portion body tapered leading edge
30: spatular portion body rounded corner trailing edge
32: plurality of longitudinal disposed spatula body through-slots
34: spatula body trailing edge short slender rod
36: handle portion elongated slender rod proximal end
38: handle portion elongated slender rod
40: handle portion elongated slender rod distal end
42: handle portion pinion gear
44: handle portion first member
46: handle portion first member substantially straight flat portion
48: handle portion first member substantially straight flat portion proximal end 50: handle portion first member substantially straight flat portion rounded distal end
52: handle portion first member substantially straight flat portion rounded distal end throughbore
54: handle portion first member substantially straight flat portion proximal end vertically disposed guide
56: handle portion first member substantially straight flat portion proximal end guide throughbore
58: handle portion first member outwardly extending arcuate shaped portion
60: handle portion first member outwardly extending arcuate shaped portion distal end
62: handle portion first member inwardly extending flat guide plate
64: handle portion first inwardly extending flat guide plate throughbore
66: handle portion arcuate-shaped second member
68: handle portion second member rounded proximal end
70: handle portion second member distal end
72: handle portion second member rounded proximal end throughbore
74: handle portion pivot pin
76: handle portion second member inwardly extending rack gear
78: handle portion spring

DETAILED DESCRIPTION OF THE PREFERRED EMBODIMENT

Referring now to the figures in which like numerals indicate like parts, and particularly to FIG. 1, the rotatable spatula of the present invention is shown generally at 10 flipping an item of food 12 disposed on a spatula portion 14 from an item of food initial position 16 to an item of food flipped position 18 by the squeezing of a user hand 20 of a user 22 on a handle portion 24.

The configuration of the rotatable spatula 10 can best be seen in FIGS. 2–5, and as such, will be discussed with reference thereto.

The spatula portion 14 of the rotatable spatula 10 has a spatula portion thin flat substantially rectangular-shaped body 26 with a spatula portion body tapered leading edge 28 and a spatular portion body rounded corner trailing edge 30. The spatula portion thin flat substantially rectangular-shaped body 26 of the spatula portion 14 has a plurality of longitudinal disposed spatula body throughslots 32 for heat dissipation.

Extending outwardly from the center of the spatula portion body rounded corner trailing edge 30 of the spatula portion thin flat substantially rectangular-shaped body 26 of the spatula portion 14 is a spatula body trailing edge short slender rod 34.

The handle portion 24 includes a handle portion elongated slender rod proximal end 36 of a handle portion elongated slender rod 38 that is disposed on, and extends outwardly from, the spatula portion body trailing edge short slender rod 34 of the spatula portion body rounded corner trailing edge 30 of the spatula portion thin flat substantially rectangular-shaped body 26 of the spatula portion 14.

The handle portion elongated slender rod 38 of the handle portion 24 has a handle portion elongated slender rod distal end 40 on which a handle portion pinion gear 42 is fixedly attached.

The handle portion 24 further includes a handle portion first member 44 that has a handle portion first member substantially straight flat portion 46 with a handle portion first member substantially straight flat portion proximal end 48 and a handle portion first member substantially straight flat portion rounded distal end 50.

The handle portion first member substantially straight flat portion rounded distal end 50 of the handle portion first member substantially straight flat portion 46 of the handle portion first member 44 of the handle portion 24 has a handle portion first member substantially straight flat portion rounded distal end throughbore 52.

Extending upwardly from the handle portion first member substantially straight flat portion proximal end 48 of the handle portion first member substantially straight flat portion 46 of the handle portion first member 44 of the handle portion 24 is a handle portion first member substantially straight flat portion proximal end vertically disposed guide 54.

The handle portion first member substantially straight flat portion proximal end vertically disposed guide 54 of the handle portion first member substantially straight flat portion proximal end 48 of the handle portion first member substantially straight flat portion 46 of the handle portion first member 44 of the handle portion 24 has a handle portion first member substantially straight flat portion proximal end guide throughbore 56 through which the spatula portion body trailing edge short slender rod 34 of the spatula portion body rounded corner trailing edge 30 of the spatula portion thin flat substantially rectangular-shaped body 26 of the spatula portion 14 rotatively passes.

A handle portion first member outwardly extending arcuate shaped portion 58 extends rearwardly from the handle portion first member substantially straight flat portion rounded distal end 50 of the handle portion first member substantially straight flat portion 46 of the handle portion first member 44 of the handle portion 24 and has a handle portion first member outwardly extending arcuate shaped portion distal end 60.

A handle portion first member inwardly extending flat guide plate 62 extends inwardly from the handle portion first member outwardly extending arcuate shaped portion distal end 60 of the handle portion first member outwardly extending arcuate shaped portion 58 of the handle portion first member 44 of the handle portion 24.

The handle portion first member inwardly extending flat guide plate 62 of the handle portion first member outwardly extending arcuate shaped portion distal end 60 of the handle portion first member outwardly extending arcuate shaped portion 58 of the handle portion first member 44 of the handle portion 24 has a handle portion first inwardly extending flat guide plate throughbore 64 through which the handle portion elongated slender rod distal end 40 of the handle portion elongated slender rod 38 of the handle portion 24 rotatively passes.

The handle portion 24 further includes a handle portion arcuate-shaped second member 66 that has a handle portion second member rounded proximal end 68 that enter into, and is pivotally mounted to, the handle portion first member substantially straight flat portion rounded distal end 50 of the handle portion first member substantially straight flat portion 46 of the handle portion first member 44 of the handle portion 24 and a handle portion second member distal end 70.

The handle portion second member rounded proximal end 68 of the handle portion arcuate-shaped second member 66 of the handle portion 24 has a handle portion second member rounded proximal end throughbore 72.

A handle portion pivot pin 74 passes through the handle portion first member distal end throughbore 52 of the handle portion first member substantially straight flat portion rounded distal end 50 of the handle portion first member 44 of the handle portion 24 and passes through the handle portion second member rounded proximal end throughbore of the handle portion second member rounded proximal end 68 of the handle portion arcuate-shaped second member 66 of the handle portion 24 so that the handle portion arcuate-shaped second member 66 of the handle portion 24 is pivotally mounted to the handle portion first member 44 of the handle portion 24.

A handle portion second member inwardly extending rack gear 76 extends inwardly from the handle portion second member distal end 70 of the handle portion arcuate-shaped second member 66 of the handle portion 24 and mechanically engages with the handle portion pinion gear 42 of the handle portion 24.

A handle portion spring 78 extends from the handle portion first member outwardly extending arcuate shaped portion 58 of the handle portion first member 44 of the handle portion 24 to the handle portion arcuate-shaped second member 66 of the handle portion 24.

In operation, the spatula portion 14 is slipped under the item of food 12 that is in the item of food initial position 16.

The handle portion 24 is squeezed by the user hand 20 of the user 22 causing the handle portion arcuate-shaped second member 66 of the handle portion 24 to pivot towards the handle portion first member 44 of the handle portion 24.

The pivoting of the handle portion arcuate-shaped second member 66 of the handle portion 24 towards the handle portion first member 44 of the handle portion 24 causes the handle portion second member inwardly extending rack gear 76 of the handle portion second member distal end 70 of the handle portion arcuate-shaped second member 66 of the handle portion 24 to rotate the handle portion pinion gear 42 of the handle portion 24.

The rotating of the handle portion pinion gear 42 of the handle portion 24 causes the handle portion elongated slender rod 38 of the handle portion 24 to rotate and flip the spatula portion 14 causing the item of food to achieve the item of food flipped position 18.

When the handle portion 24 is unsqueezed, the handle portion spring 78 causes the handle portion arcuate-shaped second member 66 of the handle portion 24 to pivot away from the handle portion first member 44 of the handle portion 24.

The pivoting away of the handle portion arcuate-shaped second member 66 of the handle portion 24 from the handle portion first member 44 of the handle portion 24 causes the handle portion second member inwardly extending rack gear 76 of the handle portion second member distal end 70 of the handle portion arcuate-shaped second member 66 of the handle portion 24 to rotate the handle portion pinion gear 42 of the handle portion 24 in the opposite direction.

The rotating of the handle portion pinion gear 42 of the handle portion 24 causes the handle portion elongated slender rod 38 of the handle portion 24 to rotate in the opposite direction and flip the spatula portion 14 back to the original position, and ready for next use.

It will be understood that each of the elements described above, or two or more together, may also find a useful application in other types of constructions differing from the types described above.

While the invention has been illustrated and described as embodied in a rotatable spatula, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A rotatable spatula, comprising:
   (a) a squeezable handle portion including a first member having a substantially straight flat portion with a proximal end and a rounded distal end with a throughbore; said first member of said squeezable handle portion further having a vertically disposed guide plate extending upwardly from said proximal end of said substantially straight flat portion of said first member of said squeezable handle portion;
   b) a spatula portion rotatively mounted to said squeezable handle portion, so that when said squeezable handle portion is squeezed said spatula portion rotates and turns over food disposed thereon; said spatula portion having a thin flat substantially rectangular-shaped body with a tapered leading edge and a rounded corner trailing edge; and
   c) a short slender rod extending outwardly from the center of said rounded corner trailing edge of said thin flat substantially rectangular-shaped body of said spatula portion; said squeezable handle portion further including an elongated slender rod having a distal end and a proximal end being fixedly attached to, and extending outwardly from, said short slender rod of said rounded corner trailing edge of said thin flat substantially rectangular-shaped body of said spatula portion; said squeezable handle portion further including a pinion gear being fixedly attached to said distal end of said elongated slender rod of said squeezable handle portion.

2. The spatula as defined in claim 1, wherein said thin flat substantially rectangular-shaped body of said spatula portion has a plurality of longitudinally disposed throughslots, so that heat can be dissipated.

3. The spatulas as defined in claim 2, wherein said vertically disposed guide plate of said proximal end of said substantially straight flat portion of said first member of said squeezable handle portion has a throughbore.

4. The spatulas as defined in claim 3, wherein said short slender rod of said rounded corner trailing edge of said thin flat substantially rectangular-shaped body of said spatula portion passes rotatively through said throughbore of said vertically disposed guide plate of said proximal end of said substantially straight flat portion of said first member of said squeezable handle portion.

5. The spatula as defined in claim 4, wherein said first member of said squeezable handle portion further has an outwardly extending arcuate shaped portion that extends rearwardly from said rounded distal end of said substantially straight flat portion of said first member of said squeezable handle portion, said outwardly extending arcuate shaped portion of said first member of said squeezable handle portion has a distal end.

6. The spatula as defined in claim 5, wherein said squeezable handle portion further includes an inwardly extending flat guide plate that extends inwardly from said distal end of said outwardly extending arcuate shaped portion of said first member of said squeezable handle portion.

7. The spatula as defined in claim 6, wherein said inwardly extending flat guide plate of said squeezable handle portion has a throughbore.

8. The spatula as defined in claim 7, wherein said distal end of said elongated slender rod of said squeezable handle portion passes rotatively through said throughbore of said inwardly extending flat guide plate of said squeezable handle portion.

9. The spatula as defined in claim 8, wherein said squeezable handle portion further includes an arcuate-shaped second member that has a rounded proximal end with a throughbore that enters into, and is pivotally mounted to, said rounded distal end of said substantially straight flat portion of said first member of said handle portion, said arcuate-shaped second member has a distal end.

10. The spatula as defined in claim 9, wherein said squeezable handle portion further includes a pivot pin that passes through said throughbore of said rounded distal end of said substantially straight flat portion of said first member of said squeezable handle portion and passes through said throughbore of said rounded proximal end of said arcuate-shaped second member of said squeezable handle portion, so that said arcuate-shaped second member of said squeezable handle portion is pivotally mounted to said first member of said squeezable handle portion.

11. The spatulas as defined in claim 10, wherein said squeezable handle portion further includes a rack gear that extends inwardly from said distal end of said arcuate-shaped second member of said squeezable handle portion and mechanically engages with said pinion gear of said squeezable handle portion.

12. The spatula as defined in claim 11, wherein said squeezable handle portion further includes a spring that extends from said outwardly extending arcuate shaped portion of said first member of said squeezable handle portion to said arcuate-shaped second member of said squeezable handle portion.

* * * * *